United States Patent
Forhaug et al.

(10) Patent No.: US 7,014,414 B2
(45) Date of Patent: Mar. 21, 2006

(54) BALE STACKER

(75) Inventors: Göran Forhaug, Sundsvall (SE); Mats Norberg, Kovland (SE); Per Larsson, Härnösand (SE)

(73) Assignee: Metso Paper, Inc., (FI)

( * ) Notice: Subject to any disclaimer, the term of this patent is extended or adjusted under 35 U.S.C. 154(b) by 363 days.

(21) Appl. No.: 10/468,710

(22) PCT Filed: Jan. 28, 2002

(86) PCT No.: PCT/SE02/00133

§ 371 (c)(1),
(2), (4) Date: Aug. 21, 2003

(87) PCT Pub. No.: WO02/066348

PCT Pub. Date: Aug. 29, 2002

(65) Prior Publication Data

US 2004/0076507 A1    Apr. 22, 2004

(30) Foreign Application Priority Data

Feb. 22, 2001  (SE) .................................... 0100639

(51) Int. Cl.
*B65G 57/30*    (2006.01)

(52) U.S. Cl. .................................... 414/795.2; 414/626
(58) Field of Classification Search ............. 414/792.8, 414/795.2, 797.5, 626

See application file for complete search history.

(56) References Cited

U.S. PATENT DOCUMENTS

| 2,948,382 | A | | 8/1960 | Russell |
| 3,190,466 | A | * | 6/1965 | Hostetier ................. 414/788.8 |
| 3,684,056 | A | * | 8/1972 | Penso .......................... 182/19 |
| 3,765,546 | A | * | 10/1973 | Westerling ............... 414/795.2 |
| 3,904,045 | A | | 9/1975 | Thibault |
| 4,764,074 | A | * | 8/1988 | Postigo .................... 414/795.2 |
| 6,422,806 | B1 | * | 7/2002 | Jenkins et al. ........... 414/795.2 |

FOREIGN PATENT DOCUMENTS

| FR | 2 580 596 A1 | 10/1986 |
| GB | 974580 A1 | 11/1964 |
| JP | 9-86663 A1 | 3/1997 |
| JP | 2000-191141 A1 | 7/2000 |
| WO | WO-00/09430 A1 | 2/2000 |

* cited by examiner

*Primary Examiner*—Janice L. Krizek
(74) *Attorney, Agent, or Firm*—Lerner, David, Littenberg, Krumholz & Mentlik, LLP

(57) ABSTRACT

Apparatus for for stacking papermaking pulp bales is disclosed, comprising two sets of lifting forks, which are directed towards each other for lifting bales, and a conveyor for inserting a new bale beneath the lifted bales. The lifting forks are horizontally movable between an advanced active lifting position and an inactive retracted position and have forward portions with a continuously decreasing thickness. The drive means for the lifting forks comprise a motor and a freewheel clutch for lifting and lowering the lifting forks, so that the lowering movement for both sets of lifting forks is automatically and individually adapted to their pulling-out movement when they rest on the underlying bale, although the speed of the drive motors which operate in a synchronized manner need not be controlled.

5 Claims, 3 Drawing Sheets

BALE STACKER

FIELD OF THE INVENTION

The present invention relates to a bale stacker for stacking pulp bales, comprising lifting forks driven by a drive means for lifting bales which are already stacked, and a conveying means for inserting a new bale beneath the lifted bales, which lifting forks are movable horizontally between advanced active lifting position and inactive retracted position.

BACKGROUND OF THE INVENTION

Papermaking pulp bales are usually held together by being tied with steel wire. A number of such bales are then stacked in a usual manner and tied around with steel wire to form an assembled bale stack. Previous stackers were utilized which placed a new bale above an already stacked bale. At present, stackers are used which lift the already stacked bales and insert a new bale beneath the already lifted bales. The lifted bale stack is then lowered onto the lowermost bale, and the lifting forks are pulled out so that the stack falls down onto the lowermost bale with a loud sound. Papermaking pulp bales are often not entirely rectangular, and this sound is especially loud when a bale thuds down onto a bale with an inclined upper surface. One or several bales can thus fall off the stack. International Applicaiton No. WO-00/09430 shows examples of known bale stackers.

One object of the present invention is to provide, in a simple and cost-effective way, a rapid and efficient bale stacker, which is relatively quiet and operates with greater safety than previously known bale stackers.

SUMMARY OF THE INVENTION

This and other objects of the present invention have now been realized by the discovery of apparatus for stacking a plurality of bales comprising a plurality of lifting forks for lifting the plurality of bales at a first location, a conveyor for transporting the plurality of bales to the first location, whereby when one of the plurality of bales has been lifted from the first location another of the plurality of bales can be transported to the first location beneath the one of the plurality of bales, the plurality of lifting forks being horizontally movable between a first advanced lifting position and a second inactive retracted position, the plurality of lifting forks including an end portion of continuously decreasing thickness, and driving means for driving the plurality of lifting forks, the driving means comprising a motor and a free wheel clutch for lifting and lowering the plurality of lifting forks.

In accordance with one embodiment of the apparatus of the present invention, the apparatus includes a traveling crab for carrying the plurality of lifting forks, vertical guide means for guiding the traveling crab in a vertical direction, a chain for driving the traveling crab, and a driving sprocket, the chain running over the driving sprocket, wherein the free wheel clutch is assembled with the driving sprocket. In accordance with another embodiment of the apparatus of the present invention, the plurality of lifting forks comprises a first plurality of lifting forks and including a second plurality of lifting forks, each of the first and second plurality of lifting forks being directed towards the conveyor for jointly lifting the plurality of bales, the conveyor disposed to transport the plurality of bales in a direction transverse to the plurality of lifting forks.

In accordance with another embodiment of the apparatus of the present invention, the apparatus includes a first traveling crab for carrying the first plurality of lifting forks and a second traveling crab for carrying the second plurality of lifting forks, first vertical guide means for guiding the first traveling crab in a vertical direction, second vertical guide means for guiding the second traveling crab in a vertical direction, a first chain for driving the first traveling crab, a second chain for driving the second traveling crab, a first driving sprocket, the first chain running over the first driving sprocket, and a second driving sprocket, the second chain running over the second driving sprocket, wherein the free wheel clutch comprises a first free wheel clutch assembled with the first driving sprocket and a second free wheel clutch assembled with the second driving sprocket. Preferably, the apparatus includes a first motor for driving the first chain and a second motor for driving the second chain, the first and second motors being synchronous.

The objects of the present invention are thus achieved in principle by the drive means for the lifting forks comprising a motor and a freewheel clutch for lifting and lowering the lifting forks.

BRIEF DESCRIPTION OF THE DRAWINGS

The present invention will be more fully appreciated with reference to the following detailed description which, in turn, refers to the figures, in which.

DETAILED DESCRIPTION

The bale stacker shown in the Figures has a rigid steel frame 11 fastened with bolts onto the floor. In the frame a conveyor, 12,13, is located which from an external conveyor (not shown) feeds bales 14 one by one (only one bale is shown, and only in FIG. 1) to the stacking position in the bale stacker, and then feeds a bale stack out to a second conveyor (not shown). It is important to position a bale accurately, and the bale stacker has several positioning means, which are not shown and described, because they belong to known and conventional art.

Figure 1:
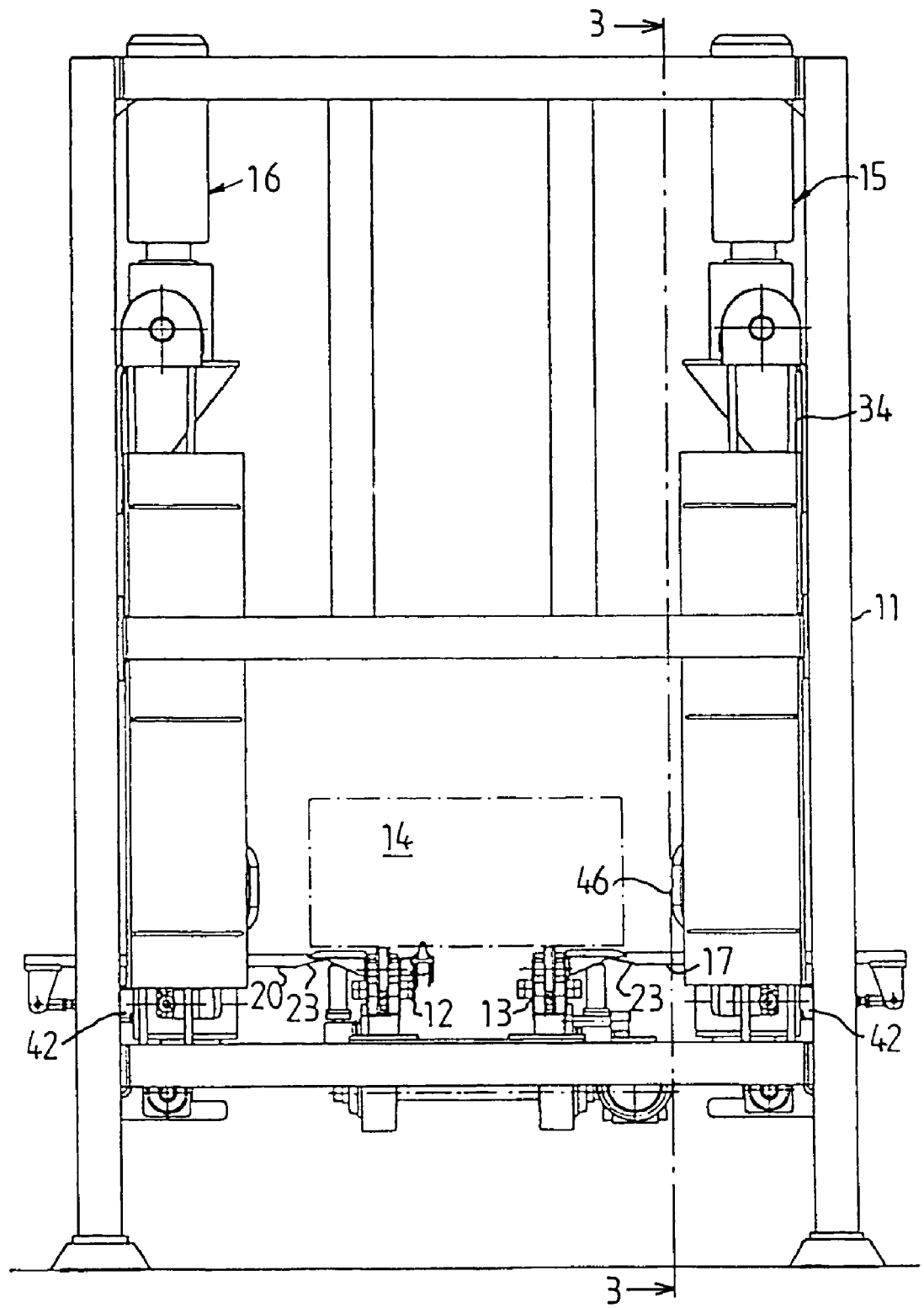
FIG. 1 is a side, elevational view of a bale stacker in one embodiment of the present invention, as seen in the direction indicated by the arrows 1—1 in FIG. 2.
Figure 2:
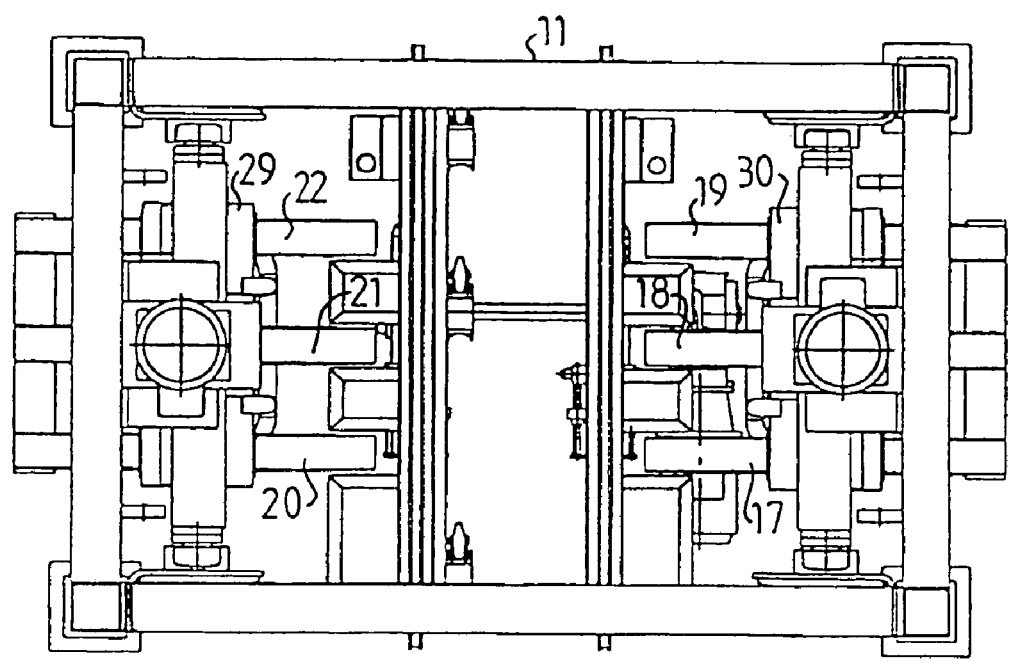
FIG. 2 is a top, elevational view of the bale stacker shown in FIG. 1.

On each side of the conveyor, 12,13, a lifting means, 15,16, is located, both of which have a number (which is three in the embodiment shown) of lifting forks, 17,18 and 19, and 20,21 and 22, respectively, which are slightly lower than the conveyors at the lower end positions. The outer portions 23 of the lifting forks have a continuously decreasing thickness, as shown in FIG. 1. The lifting forks, for example, can have a thickness of about 30 mm, and the chamfered front portion can be chamfered to a thickness of from about 5 mm to 10 mm at the point. The entire portion of the lifting forks which is inserted beneath a bale suitably can be chamfered.

Figure 3:
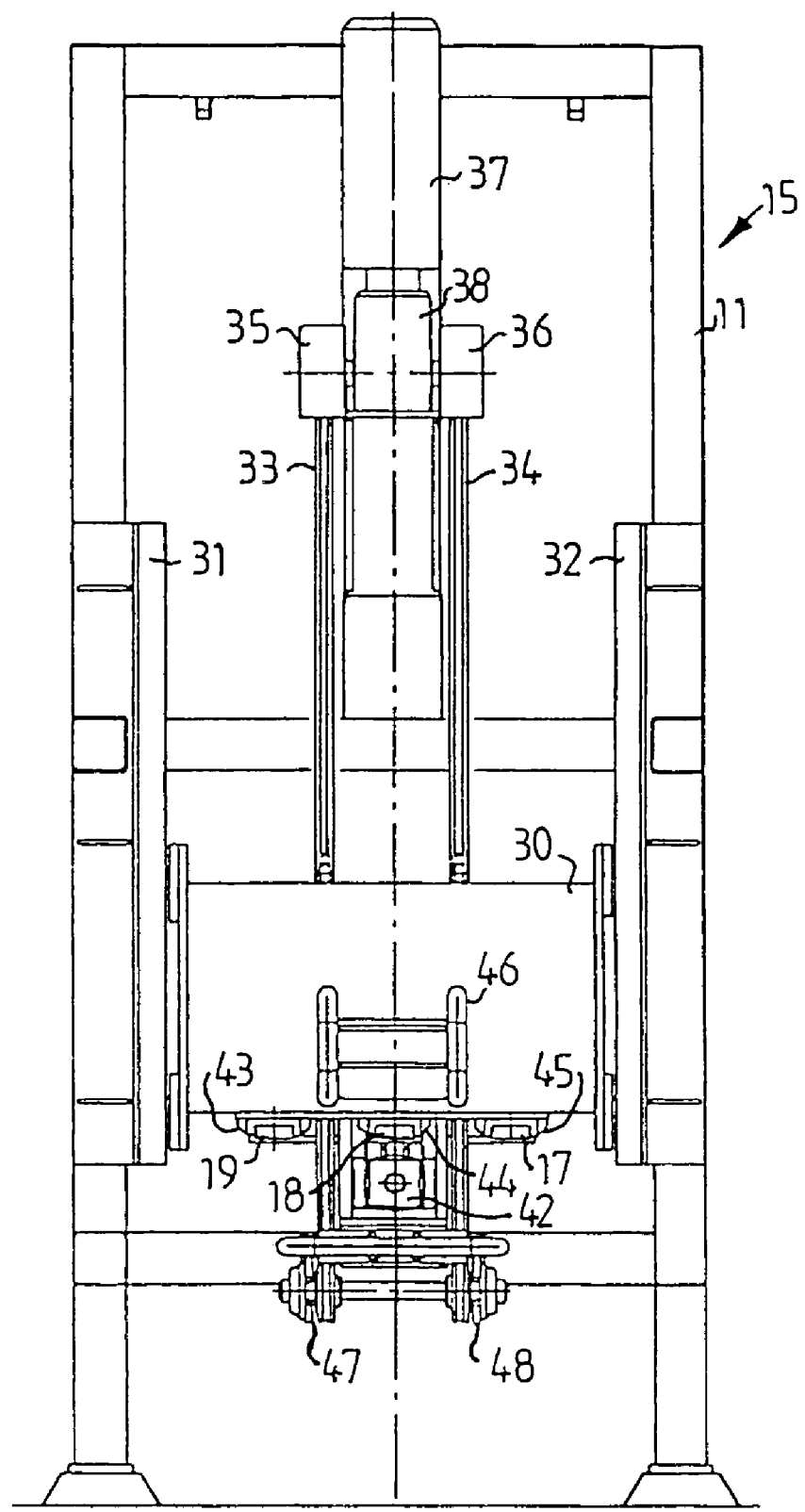
FIG. 3 is a rear, elevational view of the bale stacker shown in FIG. 1, taken as indicated by the arrows 3—3 thereon.

The lifting means, 15 and 16, thus are the drive means for lifting and lowering the lifting forks. They are identical, and only the lifting means 15 shall be described in detail with reference to FIG. 3. It has a travelling crab 30 (the lifting means 16 has a corresponding travelling crab 29), which runs in two vertical guides, 31 and 32. It is driven along the guides by two endless chains, 33 and 34, which run over two driven upper sprockets, 35 and 36, and two lower freerolling sprockets, 47 and 48. A motor 37 drives synchronously the two sprockets, 35 and 36, over a gear box 38. The sprockets, 35 and 36, have built-in freewheel clutches of a conventional kind, and the freewheel clutches are therefore not shown. A power means in the form of a cylinder 42 is coupled to the three lifting forks, 17,18 and 19, coupled together, so that they are movable horizontally in their longitudinal direction between an advanced active lifting position and a retracted inactive position. The lifting forks are guided in guides, 43,44 and 45, on the travelling crab 30 and are arranged so that they follow along in the vertical movements of the travelling crab 30. The crab has an outward movable positioning means 46, which is controlled by a power means (not shown), for example a cylinder.

A bale stacking cycle will now be described. An external conveyor (not shown) moves a bale in to the conveyor, 12 and 13, which moves the bale to a hinged stop means (not shown), which places the bale in correct position in the longitudinal direction of the conveyor. Thereafter the bale is positioned in correct position in the direction transverse to the conveyor by guide pads 46 of the travelling crabs. The lifting forks, 17–19 and 20–22, of the two travelling crabs, 29 and 30, are in an advanced position, but are in their lower end positions, in which they are on a lower level than the conveyor and, therefore, do not disturb the bale 14. During the positioning of the bale the travelling crabs, 29 and 30, are moved synchronously upward so that their oppositely directed lifting forks will lift the bale. The bale having been lifted, a new bale is moved in beneath the lifted bale and is positioned in the longitudinal and transverse directions by positioning means (not shown). The travelling crabs are now moved synchronously downward, and when they arrive at the lower bale, their lifting forks are pulled outward by their respective cylinders so that they release the bale, and the travelling crabs can continue to be moved downward to their lower end positions. There, the lifting forks are moved in to each other again, and then the travelling crabs are again moved up, and the lifting forks this time lift the two bales so that a third bale can be inserted beneath them, and they can be lowered down upon this bale, so that the bale stack now comprises three bales. In this way the desired number of bales can be stacked, and the conveyor, 12 and 13, can then move the bale stack to an external conveyor, which moves the bale stack to a station to be tied around.

Due to the chamfering of the forks, a lifted bale can land softly on the lower bale, provided that the vertical movement of the fork is synchronous with its pulling-out movement. Owing to the fact that the travelling crabs, and thereby the lifting forks, are driven by means of freewheel clutches, it is ensured that this movement will be synchronous, without requiring a complicated control system, because the synchronized motors can operate at constant speed, and the vertical speed of the lifting forks is therefore automatically adapted when the lifting forks rest on the lower bale. The two pairs of lifting forks are in this way adapted individually to the upper surface of the bale, and both pairs are pulled out resting on the upper surface of the lower bale even when said upper surface is inclined. As soon as the lifting forks no longer rest on the bale, the travelling crabs, and thereby the lifting forks, resume their downward speed, as determined by the motors. The lifting motors are permanently synchronized, and the vertical movement of the lifting forks is synchronized until a freewheel is activated during the lowering movement. When both pairs of lifting forks are lowered to their lower end positions, they are again synchronized before the next lifting movement.

The invention is described with reference to the stacking of bales with papermaking pulp, but can, of course, be used also for the stacking of other types of bales.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus for stacking a plurality of bales comprising a plurality of lifting forks for lifting said plurality of bales at a first location, a conveyor for transporting said plurality of bales to said first location, whereby when one of said plurality of bales has been lifted from said first location another of said plurality of bales can be transported to said first location beneath said one of said plurality of bales, said plurality of lifting forks being horizontally movable between a first advanced lifting position and a second inactive retracted position, said plurality of lifting forks including an end portion of continuously decreasing thickness, and driving means for driving said plurality of lifting forks, said driving means comprising a motor and a free wheel clutch for lifting and lowering said plurality of lifting forks.

2. The apparatus of claim 1 including a traveling crab for carrying said plurality of lifting forks, vertical guide means for guiding said traveling crab in a vertical direction, a chain for driving said traveling crab, and a driving sprocket, said chain running over said driving sprocket, wherein said free wheel clutch is assembled with said driving sprocket.

3. The apparatus of claim 1 wherein said plurality of lifting forks comprises a first plurality of lifting forks and including a second plurality of lifting forks, each of said first and second plurality of lifting forks being directed towards said conveyor for jointly lifting said plurality of bales, said conveyor disposed to transport said plurality of bales in a direction transverse to said plurality of lifting forks.

4. The apparatus of claim 3 including a first traveling crab for carrying said first plurality of lifting forks and a second traveling crab for carrying said second plurality of lifting forks, first vertical guide means for guiding said first traveling crab in a vertical direction, second vertical guide means for guiding said second traveling crab in a vertical direction, a first chain for driving said first traveling crab, a second chain for driving said second traveling crab, a first driving sprocket, said first chain running over said first driving sprocket, and a second driving sprocket, said second chain running over said second driving sprocket, wherein said free wheel clutch comprises a first free wheel clutch assembled with said first driving sprocket and said second free wheel clutch assembled with said second driving sprocket.

5. The apparatus of claim 4 including a first motor for driving said first chain and a second motor for driving said second chain, said first and second motors being synchronous.

* * * * *

UNITED STATES PATENT AND TRADEMARK OFFICE
CERTIFICATE OF CORRECTION

PATENT NO. : 7,014,414 B2  
DATED : March 21, 2006  
INVENTOR(S) : Göran Forhaug, Mats Norberg and Per Larsson It is certified that error appears in the above-identified patent and that said Letters Patent is hereby corrected as shown below:

Column 4,
Line 56, delete "said" (second occurrence) and insert -- a --.

Signed and Sealed this

Twenty-third Day of May, 2006

JON W. DUDAS  
*Director of the United States Patent and Trademark Office*